US010526480B2

(12) United States Patent
Ternorutsky et al.

(10) Patent No.: US 10,526,480 B2
(45) Date of Patent: Jan. 7, 2020

(54) ULTRA-HIGH SOLIDS EMULSION AND APPLICATION

(71) Applicant: HERCULES LLC, Wilmington, DE (US)

(72) Inventors: Leo Ternorutsky, East Longmeadow, MA (US); Lars Kilian, Powell, OH (US); Sandipan Dutta, Hilliard, OH (US); Kang I. Lee, Walnut Cree, CA (US); Nathan K. Ramsey, Hilliard, OH (US)

(73) Assignee: HERCULES LLC, Wilmington, DE (US)

( * ) Notice: Subject to any disclaimer, the term of this patent is extended or adjusted under 35 U.S.C. 154(b) by 108 days.

(21) Appl. No.: 15/810,757

(22) Filed: Nov. 13, 2017

(65) Prior Publication Data

US 2018/0134888 A1 May 17, 2018

Related U.S. Application Data

(60) Provisional application No. 62/422,216, filed on Nov. 15, 2016.

(51) Int. Cl.
| | | |
|---|---|---|
| *C08F 2/24* | (2006.01) | |
| *C08F 2/26* | (2006.01) | |
| *C08F 2/30* | (2006.01) | |
| *C08F 4/30* | (2006.01) | |
| *C08F 4/34* | (2006.01) | |
| *C08F 220/18* | (2006.01) | |
| *C08F 220/06* | (2006.01) | |
| *C08F 218/04* | (2006.01) | |
| *C08F 218/08* | (2006.01) | |
| *C08F 226/10* | (2006.01) | |
| *C08F 212/08* | (2006.01) | |
| *C08F 216/02* | (2006.01) | |
| *C08L 33/08* | (2006.01) | |
| *C09D 5/02* | (2006.01) | |
| *C09D 133/08* | (2006.01) | |
| *C09J 11/06* | (2006.01) | |
| *C09J 133/08* | (2006.01) | |
| *C08F 2/22* | (2006.01) | |

(52) U.S. Cl.
CPC ............ *C08L 33/08* (2013.01); *C08F 220/18* (2013.01); *C09D 5/022* (2013.01); *C09D 5/027* (2013.01); *C09D 133/08* (2013.01); *C09J 11/06* (2013.01); *C09J 133/08* (2013.01); *C08F 2/22* (2013.01); *C08F 2/24* (2013.01); *C08F 2/26* (2013.01); *C08F 2/30* (2013.01); *C08F 4/30* (2013.01); *C08F 4/34* (2013.01); *C08F 212/08* (2013.01); *C08F 216/02* (2013.01); *C08F 218/04* (2013.01); *C08F 218/08* (2013.01); *C08F 220/06* (2013.01); *C08F 226/10* (2013.01); *C08F 2220/1808* (2013.01); *C08L 2201/50* (2013.01); *C08L 2201/52* (2013.01)

(58) Field of Classification Search
None
See application file for complete search history.

(56) References Cited

U.S. PATENT DOCUMENTS

| | | | | |
|---|---|---|---|---|
| 5,264,532 A | * | 11/1993 | Bernard | ................ C08F 220/12 |
| | | | | 526/261 |
| 6,136,903 A | | 10/2000 | Su et al. | |
| 6,908,524 B2 | * | 6/2005 | Goldstein | ............... B31F 1/126 |
| | | | | 156/183 |
| 8,592,040 B2 | | 11/2013 | Hayes et al. | |
| 9,102,848 B2 | * | 8/2015 | Hamilton | ............. C09D 133/26 |
| 2003/0114586 A1 | | 6/2003 | Goldstein et al. | |
| 2005/0250887 A1 | | 11/2005 | Yang et al. | |
| 2010/0016493 A1 | | 1/2010 | Ternorutsky et al. | |
| 2011/0151251 A1 | | 6/2011 | Schumacher et al. | |
| 2014/0316050 A1 | * | 10/2014 | Schrinner | ............. C08F 265/06 |
| | | | | 524/507 |

FOREIGN PATENT DOCUMENTS

| | | | | |
|---|---|---|---|---|
| JP | 08231887 A | * | 9/1996 | |
| JP | 09111156 A | * | 4/1997 | |
| WO | WO19931153 A2 | | 6/1999 | |

* cited by examiner

*Primary Examiner* — Richard A Huhn
(74) *Attorney, Agent, or Firm* — Williams J. Davis; Nathalie Tietcheu

(57) ABSTRACT

The present disclosure is directed to an ultra-high solids emulsion comprising a plurality of multiphase polymer particles, in which the multiphase particles comprises an acrylic-based copolymer derived from monomers comprising an alkyl methacrylate; an alkyl acrylate; a hydroxyalkyl acrylate; at least one or more acids; a vinyl aromatic compound; and a vinyl ester or vinyl lactam, a copolymerizable surfactant, at least one or more alkylphenol ethoxylate (APE) free nonionic surfactants, and at least one or more APE free anionic surfactants in aqueous medium in the presence of an initiator and a buffer. Additionally, methods for preparing such ultra-high solids emulsion and applications of such emulsion in coatings and adhesives are disclosed.

24 Claims, No Drawings

ULTRA-HIGH SOLIDS EMULSION AND APPLICATION

CROSS REFERENCE TO RELATED APPLICATIONS

The present application claims the benefit under 35 U.S.C. 119 (e) of U.S. Provisional Patent Application Ser. No. 62/422,216, filed on Nov. 15, 2016, the entire content of which is hereby expressly incorporated herein by reference.

FIELD OF THE INVENTION

The presently disclosed process(es), procedure(s), method(s), product(s), result(s), and/or concept(s) (collectively referred to hereinafter as the "present disclosure") relates generally to an ultra-high solids emulsion comprising a plurality of multiphase polymer particles that contains an environmentally friendly acrylic-based copolymer. Additionally, the present disclosure relates generally to methods for preparing such ultra-high solids emulsion and applications of the ultra-high solids emulsion in coatings and adhesives.

BACKGROUND OF THE INVENTION

The utility of aqueous polymeric dispersions (also called aqueous polymeric emulsions) in the preparation of paints, coatings, adhesives and caulks or sealants is well known. Water based or water borne polymer dispersions are often preferred because of theft relatively low cost, ease of application and relatively low amounts of volatile organic compounds (VOC) contained therein. There is an increasing need for higher solids dispersions which will provide faster setting times for use on high speed production equipment. High solids adhesive bases may also find use as replacements for conventional hot melt (100% solids) material which requires elevated temperatures with consequent expenditures of considerable energy. In addition to the need for high solids dispersion for such applications, it is also essential that the dispersions remain sufficiently low in viscosity that they can be applied using conventional equipment. Considerable effort has been expended to provide aqueous dispersions of polymeric materials which are characterized by a high solids content.

Pressure-sensitive adhesives find use in a wide variety of applications, such as automotive, aerospace, construction and electrical markets, either in the form of tapes or as adhesive coatings on other backings. As the society becomes more aware of the significance of environmental protection, industrial products such as adhesive that is harmful to the ecological environment are gradually being replaced and eliminated.

Coated surfaces, especially those coated with modern low VOC coatings containing 100 g/L. VOC or less, such as moldings and panels often become visibly discolored after contact with water repeatedly or over extended periods of time. This problem is enhanced when high polymer content coatings are used on the surfaces. Other issues that can occur with painted surfaces are blistering and surfactant leaching, wherein water-soluble components are extracted from the coatings and deposited on the coated surface. Minimizing the amount of water-soluble ingredients has been used to reduce surfactant leaching. However, the water-soluble components are generally substituted with volatile organic compounds (VOCs), resulting in an environmentally undesirable product.

Surfactants have widely been used as emulsification, dispersion, cleaning, wetting and foaming. Emulsifiers for emulsion polymerization, which are used upon producing polymers by emulsion polymerization, are known not only to take part in polymerization-initiating reactions and polymer-forming reactions but also to affect the mechanical stability, chemical stability, freezing stability, storage stability and the like of the resulting emulsions. Further, they are also known to give significant effects on physical properties of the emulsions, such as particle size, viscosity and foaming potential and, when formed into films, physical properties of the films, such as waterproofness, weatherability, adhesion and heat resistance.

Surfactants can also be used as reactants, often called reactive surfactants. Surfactants used in polymerization are also called polymerizable and/or copolymerizable surfactants. Among the reactive surfactants, those containing one or more phenyl ether groups as hydrophobic groups have found wide-spread utility for their excellent properties such as emulsifying property, dispersing property, and polymerization-stabilizing property. Thus, surfactants that are based on alkyl phenol ethoxylates (APES) have been widely used in emulsion polymerization. In recent years, however, a concern has arisen about a potential problem that nonyl phenol ethoxylates may show false hormone effects on organisms to disrupt the endocrine system, that is, the so-called endocrine problem has arisen, so that research has also been conducted in efforts to provide replacements for the reactive surfactants containing one or more phenyl ether groups.

Accordingly, there is a need in the art for an aqueous dispersion and/or emulsion with ultra-high solids but environmentally friendly in preparations and applications.

DETAILED DESCRIPTION

Before explaining at least one embodiment of the present disclosure in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the present disclosure have been described in terms of preferred embodiments, it will be apparent to those of ordinary skill in the art that variations may be applied to the articles and/or methods and in the steps or in the sequence of steps of the method(s) described herein without departing from the concept, spirit and scope of the present disclosure. All such similar substitutes and modifications apparent to those skilled in the art are deemed to be within the spirit, scope and concept of the present disclosure.

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method(s) being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The terms "or combinations thereof" and "and/or combinations thereof" as used herein refer to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

For purposes of the following detailed description, other than in any operating examples, or where otherwise indicated, numbers that express, for example, quantities of ingredients used in the specification and claims are to be understood as being modified in all instances by the term "about". The numerical parameters set forth in the specification and attached claims are approximations that may vary depending upon the desired properties to be obtained in carrying out the invention.

The term "monomer" refers to a small molecule that chemically bonds during polymerization to one or more monomers of the same or different kind to form a polymer.

The term "polymer" refers to a large molecule prepared from one or more types of monomer residues (repeating units) connected by covalent chemical bonds. By this definition, polymer encompasses compounds wherein the number of monomer units may range from very few, which more commonly may be called as oligomers, to very many.

The term "copolymer" herein refers to a polymer prepared from more than one monomers.

As used herein, the term "multiphase" means that the polymer particles include two or more phases.

As used herein, the term "emulsion" refers to a homogeneous multiphased system that is made of extremely fine particles and liquids. The liquids can include aqueous and/or non-aqueous solutions and/or suspensions.

The present disclosure relates to an ultra-high solids emulsion comprising a plurality of multiphase polymer particles. The multiphase polymer particles comprise an acrylic-based copolymer derived from monomers comprising an alkyl methacrylate, an alkyl acrylate, a hydroxyalkyl acrylate or hydroxyalkyl methacrylate, at least one acid, a vinyl aromatic compound, and a vinyl ester or vinyl lactam; at least one copolymerizable surfactant; at least one alkylphenol ethoxylate (APE) free nonionic surfactant; and at least one APE free anionic surfactant in an aqueous medium in the present of a free-radical initiator and a buffer.

The suitable alkyl acrylates can include alkyl acrylates having 1 to about 20 carbon atoms in the alkyl group. In one non-limiting embodiment, the alkyl acrylate can be selected from the group consisting of n-butyl acrylate, sec-butyl acrylate, tert-butyl acrylate, 2-ethylhexyl acrylate, iso-bornyl acrylate, iso-bornyl methyl acrylate, ethyl acrylate, iso-octyl acrylate and decyl acrylate, and hexyl acrylate.

Non-limiting examples of useful alkyl methacrylates can include methyl methacrylate, ethyl methacrylate, 2-ethylhexyl methacrylate, n-butyl methacrylate, sec-butyl methacrylate, tert-butyl methacrylate and dodecyl methacrylate.

Examples of hydroxyalkyl acrylate or hydroxyalkyl methacrylate can include, but are not limited to, hydroxyethyl acrylate, hydroxyethyl methacrylate, hydroxypropyl acrylate, hydroxypropyl methacrylate, 4-hydroxybutyl acrylate and 4-hydroxybutyl methacrylate.

Examples of the vinyl aromatic compound can include, but are not limited to, styrene; vinyl toluene; alkylstyrene such as methylstyrene, ethylstyrene, butylstyrene, p-tert-butylstyrene and dimethylstyrene; halogenated styrene such as chlorostyrene, bromostyrene and fluorostyrene; halogen-substituted alkylstyrene such as chloromethylstyrene; alkoxystyrene such as methoxystyrene and carboxymethylstyrene; alkyletherstyrene; alkylsilylstyrene; vinylbenzenesulfonic acid esters; and vinylbenzyldialkoxy phosphide.

In one non-limiting embodiment, the vinyl aromatic compounds can be styrene, α-methylstyrene, o-chlorostyrene, or vinyl toluene.

Non-limiting examples of the vinyl ester useful in the present disclosure can include vinyl acetate, vinyl propionate, vinyl butyrate, vinyl iso-butyrate, vinyl valerate, and vinyl versatate. The vinyl lactam can be vinyl pyrrolidone or vinyl caprolactam.

Examples of the acids useful in the present disclosure can include, but are not limited to, acrylic acid, methacrylic acid, itaconic acid, dimethacrylic acid, maleic acid, fumaric acid, and beta-carboxyethyl acrylate.

The copolymerizable surfactant can have the following structure represented by Formula (I):

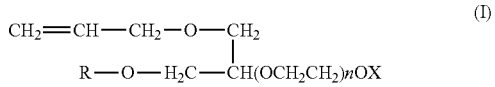

where: R is C9-C15 alkyl or C7-C11 alkyl-phenyl; X is H, SO₃NH₄, or SO₃Na; and n is 3 to 50. In one non-limiting embodiment, R is C10-C14 alkyl, X is H or SO₃NH₄, and n is 5 to 40. In another non-limiting embodiment, n is 5 to 25, or 5 to 20, or 5 to 15 (e.g., n=10).

Exemplary copolymerizable surfactants wherein R is C10-C14 alkyl can include ADEKA REASOAP series ER and SR surfactants (Adeka Corporation; Tokyo, Japan), such as ER-10, ER-20, ER-30, ER-40, SR-10, SR-20, and SR-1025. For example, ADEKA REASOAP SR-10, which includes ammonium salts of poly(oxy-1,2-ethanediyl), alpha-sulfo-omega-[1-(hydroxymethyl)-2-(2-propenyloxy) ethoxy]-, C11-rich, C10-14-branched alkyl ethers, can be used. Exemplary copolymerizable surfactants in which R is C7-C11 alkyl-phenyl can include ADEKA REASOAP series NE and SE surfactants, such as NE-10, NE-20, NE-30, NE-40, NE-50, SE-10N, SE-20N, and SE-1025N.

Further examples of suitable copolymerizable surfactants can include MAXEMUL™ surfactants, alkenyl functional non-ionic surfactants commercially available from Croda Coatings & Polymers (Edison, N.J.); HITENOL® BC surfactants, a series of polyoxyethylene alkylphenyl ether ammonium sulfates and sodium polyoxyethylene alkylether sulfuric ester, for example, Hitenol® BC 10, Hitenol® KH-05, Hitenol® KH-1025 and Hitenol® AR-10, commercially available from Dai-ichi Kogyo Seiyaku Co., Ltd. (Kyoto, Japan); Eleminol® JS-20 surfactants of sodium alkyl allyl sulphosuccinate, commercially available from Sanyo Chemical Industries, Ltd. (Kyoto, Japan); and sodium vinyl sulfonate. Additional examples of suitable copolymerizable surfactants are described in U.S. Pat. No. 6,841,655, which is hereby incorporated by reference in its entirety.

The APE free anionic surfactants used in the present disclosure can include, but are not limited to, sodium lauryl ether sulfate, sodium lauryl ethoxylate, sodium tridecyl ether sulfate, sodium salt of linear sulfated alcohol ethoxylate, sodium alpha olefin sulphonate, sodium dodecylbenzene sulphonate, disodium alkyl diphenyloxide sulphonate, sodium dioctyl sulfosuccinate, sodium lauryl ether sulfate and alkyldiphenyloxide disulphonate disodium salt.

The commercially available APE free anionic surfactants can include, but are not limited to, Rhodapex® AB 20, Rhodapon® SB 8208S, Rhodapex® LA 40S, Rhodapex® EST 30. ABEX JKB, Abex 2005, Rhodacal® A 246 L, Rhodacal® DS-10, Rhodacal® DSB, Aerosol® A 102 and Aerosol® OT-75, produced by Solvay S.A.; Polystep® B 19 and Polystep® B 23 produced by Stepan Company; and DowfaX™ 2A1 produced by The Dow Chemical Company.

The APE free nonionic surfactant is selected from the group consisting of linear alcohol ethoxylate, secondary alcohol ethoxylate, tridecyl alcohol ethoxylate, and polyethoxylated oley alcohol.

The commercially available APE free nonionic surfactants can include, but are not limited to, Tergitol™ 15-S-9, Tergitol™ 15-S-12, Tergitol™15-S-15, Tergitol™ 15-S-20, and Tergitol™ 15-S-30, produced by The Dow Chemical Company; and Abex® 2515, Rhodasurf® BC 610, Rhodasurf® BC 720, Rhodasurf® ON-877, and Rhodasurf® 3065, Abex® 2535, produced by Solvay S.A.

The free-radical initiators can be water-soluble initiators. Examples of the water-soluble initiators can include, but are not limited to, persulfates such as sodium persulfate (Na₂S₂O₈) and potassium persulfate; peroxides such as hydrogen peroxide and tert-butyl hydroperoxide (t-BHP); and azo compounds such as VAZO™ initiators, commercially available from The Chemours Company. They can be used alone or in combination with one or more reducing agents or activators, for example, bisulfites, metabisulfites, ascorbic acid, erythorbic acid, sodium formaldehyde sulfoxylate, ferrous sulfate, ferrous ammonium sulfate, and ferric ethylenediamine tetraacetic acid.

In one non-limiting embodiment, the free-radical initiator is selected from the group consisting of sodium persulfate, ammonium persulfate, potassium persulfate, t-butyl hydroperoxide, sodium formaldehydesulfoxylate, zinc formaldehydesulphoxylate, and disodium salts of 2-hydroxy-2-sufinatoacetic acid and 2-hydroxy-2-sufonatoacetic acid such as Bruggolite® FF6/M/FF7, commercially available from Brüggemann Chemical In general, the amounts of the free-radical initiators employed can be varied from 0.1 to 2% by weight, based on the total amount of the monomers to be polymerized. The way the initiator is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an ordinary person skilled in the art both from the chemical nature of the free-radical initiator system and on the polymerization temperature.

The buffer used in the present disclosure can be selected from the group consisting of disodium pyrophosphate, sodium citrate, sodium bicarbonate and sodium carbonate.

The aqueous medium may be composed either of water alone or of mixtures of water and water-miscible liquids such as methanol. In one non-limiting embodiment, the aqueous medium is water alone.

In one non-limiting embodiment, the acrylic-based copolymer can be derived from about 20 to about 60% by weight of the alkyl methacrylate, from about 20 to about 80% by weight of the alkyl acrylate, from about 0.05 to about 10% by weight of the hydroxyalkyl acrylate or hydroxyalkyl methacrylate, from about 0.3 to about 3% by weight of the acid, from about 0.5 to about 15% by weight of the vinyl aromatic compound, from about 0.5 to about 10% by weight of the vinyl ester or vinyl lactam, and from about 0.01 to about 15% by weight of the copolymerizable surfactant.

In another non-limiting embodiment, the acrylic-based copolymer can be derived from about 50 to about 70% by weight of the alkyl methacrylate, from about 40 to about 80% by weight of the alkyl acrylate, from about 0.1 to about 10% by weight of the hydroxyalkyl acrylate or hydroxyalkyl methacrylate, from about 0.3 to about 3% by weight of at the acid, from about 0.5 to about 15% by weight of the vinyl aromatic compound, from about 0.1 to about 15% by weight of the vinyl ester or vinyl lactam, and from about 1 to about 15% by weight of the copolymerizable surfactant.

The acrylic-based copolymer can be further derived from a cross-linker. In one non-limiting embodiment, the cross-linker can be selected from the group consisting of 1,3- butanediol dimethacrylate, 1,4-butanediol dimethacrylate, diacetone acrylamide (with any one of adipic dihyrazide, oxalic acid dihydrazide, malonic acid dihydrazide, glutaric acid dihydrazide, succinic acid dihyrazide, adipic acid dihydrazide, sebacic acid dihydrazide), acrylamide, isobutyl methacrylamide, 1,6-hexane diol diacrylate, zinc oxide, metal acetyl acetonate, acetoacetoxyethylmethacrylate (AAEM), glycide methacrylate, hexamethylenediamine and urea. The cross-linker can be varied from 0 to about 8% by weight or from 0 to about 5% by weight.

A small amount (e.g., from about 0.05 to about 0.3% by weight of the monomers) of a chain transfer agent or other molecular weight regulator, to control average polymer chain length of the acrylic-based copolymers can be used for the polymerization in the present disclosure. Non-limiting examples of the chain transfer agent can include 1-dodecyl mercaptan (1-DDM), t-dodecyl mercaptan (t-DDM), 1-butyl mercaptan, ascorbic acid, monothioglycerol, mercapto acetates, butylated hydroxyanysole, and long chain alcohols.

The present disclosure also relates to a method of producing the acrylic-based copolymer. In one aspect, the method comprises the steps of:

(I) mixing a buffer, a first portion of at least one APE free anionic surfactant and a first portion of at least one APE free nonionic surfactant in an aqueous medium to form a mixture, (II) increasing a temperature of the mixture to about 30° C. to about 95° C., or about 75° C. to about 90° C., or about 75 to about 80° C., or about 76 to about 79° C., (III) adding an aqueous pre-emulsion solution into the mixture, wherein the aqueous pre-emulsion solution comprises monomers comprising an alkyl methacrylate, an alkyl acrylate, a hydroxyalkyl acrylate or hydroxyalkyl methacrylate, at least one acid, a vinyl aromatic compound, and a vinyl ester or vinyl lactam; at least one copolymerizable surfactant; a second portion of at least one APE free nonionic surfactant; a second portion of at least one APE free anionic surfactant; a chain transfer agent; a free-radical initiator; and a buffer, (IV) increasing the temperature to about 75° C. to about 90° C., or about 79° C. to about 89° C., or about 79 to about 86° C., and (V) maintaining the temperature of the step (IV) for about 3 to about 5 hours to form the acrylic-based copolymer.

In one non-limiting embodiment, the first portion of APE free anionic surfactant can be varied from about 0.1 to about 1% by weight and the second portion of APE free anionic surfactant can be varied from about 0.5 to about 4% by weight. The first portion of APE free nonionic surfactant can be varied from about 0.1 to 2% by weight and the second portion of APE free nonionic surfactant can be varied from about 0.01 to 1% by weight.

In another aspect, a method of producing the acrylic-based copolymer, comprising steps of:

(I) mixing a first buffer, a first portion of at least one APE free anionic surfactant and a first portion of at least one APE free nonionic surfactant in an aqueous medium to form a first mixture;

(II) adding first portions of hydroxyalkyl acrylate or hydroxyalkyl methacrylate, alkyl methacrylate, vinyl aromatic compound and at least one acid into the first mixture to form a first reaction mixture;

(III) mixing at least one copolymerizable surfactant, a chain transfer agent, a second portion of at least one APE free anionic surfactant, a second portion of at least one APE free nonionic surfactant in the aqueous medium for at least 10 minutes to form a second mixture;

(IV) adding second portions of hydroxyalkyl acrylate or hydroxyalkyl methacrylate, alkyl methacrylate, vinyl aromatic compound and at least one acid and vinyl ester or vinyl lactam into the second mixture to form a second reaction mixture;

(V) heating the first reaction mixture to about 70° C. to about 90° C., or about 75 to about 85° C., or about 75° C. about 80° C., or about 76 to about 79° C., (VI) adding a first portion of free-radical initiator into the first reaction mixture;

(VII) adding the second reaction mixture, a second portion of free-radical initiator, and a second buffer once the first reaction mixture reaches to about 80° C.; and (VIII) maintaining the temperature of the step (VII) at about 85 to about 89° C. from about 3 to about 6 hours to form the acrylic-based copolymer.

In one non-limiting embodiment, the first portion of APE free anionic surfactant can be varied from about 0.1 to about 1% by weight and the second portion of APE free anionic surfactant can be varied from about 0.5 to about 4% by weight. The first portion of APE free nonionic surfactant can be varied from about 0.1 to about 2% by weight and the second portion of APE free nonionic surfactant can be varied from about 0.01 to about 1% by weight. The first portions of hydroxyalkyl acrylate or hydroxyalkyl methacrylate, alkyl methacrylate, vinyl aromatic compound and at least one acid comprise about 5 to about 30% by weight of the alkyl acrylate, about 0.1 to about 5% by weight of the vinyl aromatic compound, 0 to about 2% by weight of the hydroxyalkyl acrylate or hydroxyalkyl methacrylate, and about 0.01 to about 0.8% by weight of the acid. The second portions of hydroxyalkyl acrylate or hydroxyalkyl methacrylate, alkyl methacrylate, vinyl aromatic compound and at least one acid comprise about 40 to about 80% by weight of the alkyl acrylate, about 0.5 to about 5% by weight of the alkyl methacrylate, about 0.5 to about 5% by weight of the vinyl aromatic compound, about 0.1 to about 5% by weight of the hydroxyl alkyl acrylate, and about 0.1 to about 1% by weight of the acid.

The alkyl methacrylate, the alkyl acrylate, the hydroxyalkyl acrylate or hydroxyalkyl methacrylate, the acids, the vinyl aromatic compound, the vinyl ester or vinyl lactam, the copolymerizable surfactant, the APE free nonionic and anionic surfactants, the free-radical initiator, the buffer, the chain transfer agent and the aqueous medium are the same as those described previously. The emulsion polymerization can be carded out either as a batch, semi-batch, or continuous process. Typically, a semi-batch process is used.

The solids contents of the emulsion can be varied from about 45% to about 75% by weight. In one non-limiting embodiment, the emulsion can comprise at least 60% by weight of the dispersed acrylic-based copolymer. In another non-limiting embodiment, the emulsion can comprise at least 65% by weight of the dispersed acrylic-based copolymer. In order to be able to achieve solids contents >60% by weight, a bimodal or polymodal particle size ought to be set, since otherwise the viscosity becomes too high and the dispersion can no longer be managed. Producing a new generation of particles can be accomplished, for example, by adding seed before or during the emulsion polymerization, by adding excess quantities of emulsifier, or by adding mini-emulsions. A further advantage associated with the combination of low viscosity and high solids content is the improved coating behavior at high solids contents. Producing one or more new generations of particles can be done at any desired point in time. It is guided by the target particle size distribution for a low viscosity.

The average particle size of the polymer particles that are dispersed in the emulsion can be varied from about 100 to about 500 nm. The size distribution of the dispersed particles may be monomodal, bimodal or multimodal. In the case of monomodal particle size distribution, the average particle size of the polymer particles dispersed in the emulsion can be less than 500 nm. In the case of bimodal or multimodal particle size distribution, the particle size may also be up to about 1000 nm. By average particle size here is meant the d50 value of the particle size distribution, i.e., 50% by weight of the total mass of all the particles have a particle diameter smaller than the d50 value. The particle size distribution can be determined using the dynamic light scattering with Microtrac's Nanotrac model.

The acrylate-based copolymer has a glass transition temperature ($T_g$) of −55 to +70° C. or −60 to +60° C. The glass transition temperature can be determined by customary methods such as differential scanning calorimetry (For example, ASTM D3418-82 Standard Test Method for Transition Temperatures of Polymers by Thermal Analysis, midpoint temperature).

The emulsion of the present disclosure can be used to prepare products, including coatings, adhesives, and caulks. The present disclosure relates to a coating formulation comprising an ultra-high solids emulsion. The emulsion comprises a plurality of multiphase polymer particles comprising an acrylic-based copolymer. The copolymer can be derived from monomers comprising an alkyl methacrylate, an alkyl acrylate, hydroxyalkyl acrylate or hydroxyalkyl methacrylate, at least one or more acids, a vinyl aromatic compound and a vinyl ester or vinyl lactam; a copolymerizable surfactant; at least one or more APE free nonionic surfactant; and at least one or more APE free anionic surfactant in the presence of an initiator and a buffer.

The coating formulation can further comprise one or more pigments. The term "pigment" as used herein includes non-film-forming solids such as extenders and fillers. The pigment can be selected from the group consisting of $TiO_2$ (in both anastase and rutile forms), clay (aluminum silicate), $CaCO_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Suitable pigment mixtures can include blends of metal oxides such as those sold under the marks Minex® (oxides of silicon, aluminum, sodium and potassium, commercially available from Unimin Specialty Minerals), Celites® (aluminum oxide and silicon dioxide, commercially available from Imerys Filtration Minerals), and Attagel® (commercially available from BASF Corporation). In one non-limiting embodiment, the pigment can be $TiO_2$, $CaCO_3$, or clay.

Generally, the mean particle sizes of the pigments can range from about 0.01 to about 50 microns. For example, the $TiO_2$ particles used in the aqueous coating formulation typically have a mean particle size of from about 0.15 to about 0.40 microns. The pigment can be added to the aqueous coating formulation as a powder or in slurry form. The pigment can be present in the aqueous coating formulation in an amount from about 5 to about 50 percent by weight, or from about 10 to about 40 percent by weight (i.e. the weight percentage of the pigment based on the total weight of the coating formulation).

The coating formulation can optionally contain conventional coating additives such as, for example, dispersants, additional surfactants (i.e. wetting agents), rheology modifiers, defoamers, thickeners, initiators (including photoinitiators), stabilizers, buffering agents, salts, preservatives, fire retardants, biocides, mildewcides, protective colloids, corrosion inhibitors, cross-linkers, crosslinking promoters, lubricants, colorants such as colored pigments and dyes, waxes, and perfumes.

The coating formulation described herein can be used to prepare clear and pigmented systems. The coating formulations can be used to produce flat, satin, or high gloss paint. The gloss of the coating formulations can be determined using a gloss meter (e.g., BYK Gardner Trigloss 4520; Bavaria, Germany) according to the ASTM Test Method for Specular Gloss (D523). Alternatively, the gloss of the coating formulation can be determined using goniophotometry. Suitable gloss numbers for flat paint at 85° can be, for example, from 0 to 7. Suitable gloss numbers for semi-gloss paint at 20° can range from 10 to 25. When measured at 60°, suitable gloss numbers for semi-gloss paint can range from 40 to 65. For high gloss paints, suitable gloss numbers can range from 40 to 60 when measured at 20° and from 70 to greater than 90 when measured at 60°. The coating formulations described herein also display water whitening resistance and low surfactant leaching properties.

The ultra-high solids emulsion can also be used to prepare adhesives. The present disclosure also relates to an adhesive composition comprising an ultra-high solids emulsion. The emulsion comprises a plurality of multiphase polymer particles comprising an acrylic-based copolymer. The copolymer can be derived from monomers comprising an alkyl methacrylate, an alkyl acrylate, hydroxyalkyl acrylate or hydroxyalkyl methacrylate, at least one or more acids, a vinyl aromatic compound and a vinyl ester or vinyl lactam; a copolymerizable surfactant; at least one or more APE free nonionic surfactant; and at least one or more APE free anionic surfactant in the presence of an initiator and a buffer.

The adhesive composition further comprises a solution medium or dispersion medium. The solution medium or dispersion medium of the adhesive composition may be composed either of water or of mixtures of water and water-miscible liquids such as methanol or ethanol. In one non-limiting embodiment, the solution medium is water. The pH of the polymer emulsion or of the adhesive composition can be greater than 4.5, or between about 5 and about 9.5.

The adhesive compositions may be composed solely of the solution medium and the copolymer emulsion. Alternatively, the adhesive composition may also comprise other additives, examples being fillers, dyes, flow control agents, thickeners (e.g. associative thickeners), defoamers, pigments, wetting agents or tackifiers (tackifying resins). For improved surface wetting, the adhesives may comprise wetting assistants, examples being fatty alcohol ethoxylates, polyoxy-ethylenes, polyoxy-propylenes or sodium dodecylsulfonates. The amounts of additives are generally about 0.05 to about 5 parts by weight, or about 0.1 to about 3 parts by weight, per 100 parts by weight of polymer (solids).

In one non-limiting embodiment, the adhesive composition of the present disclosure can be a pressure-sensitive adhesive (PSA). A PSA is a viscoelastic adhesive whose set film at room temperature (20° C.) in the dry state remains permanently tacky and adhesive. The bonding to substrates takes place immediately, upon gentle applied pressure.

The adhesive composition of the present disclosure can be used for producing self-adhesive articles. The articles are at least partly coated with the PSA. The self-adhesive articles can be removed again after bonding. The self-adhesive articles may be, for example, sheets, tapes or labels.

Examples of suitable backing materials include paper, polymeric films, and metal foils. In the case of self-adhesive tapes of the present disclosure, the tapes may be coated on one side or both sides comprising the substances above. In the case of self-adhesive labels of the present disclosure, the labels may, be of paper or of a thermoplastic film. Suitable thermoplastic films include, for example, films of polyolefins (e.g., polyethylene, polypropylene), polyolefin copolymers, films of polyesters (e.g., polyethylene terephthalate) or polyacetate. The surfaces of the thermoplastic polymer films can be corona-treated. The labels are coated with adhesive on one side. The substrates for the self-adhesive articles are paper and polymer films. In one non-limiting embodiment, the self-adhesive articles can be paper labels.

The articles are coated on at least one surface at least partly with an adhesive composition of the present disclosure. The adhesive composition may be applied to the articles by typical methods such as knife coating or spreading. Application is generally followed by a drying step for removing the water. The thickness of the dried film can be varied from about 0.1 to about 3 millimeters.

The substrates to which the self-adhesive articles can advantageously be applied may be, for example, metal, wood, glass, paper or plastic. The self-adhesive articles are suitable more particularly for bonding to packaging surfaces, cartons, plastic packaging, books, windows, motor vehicle bodies or bodywork parts. The self-adhesive articles can be removed from the articles again by hand, without residue of adhesive on the article. Adhesion to the articles is good, and yet the sheets, tapes, and labels are readily removable. This good removability is retained even after a relatively long time. Paper labels exhibit good strikethrough behavior and good printability.

The polymers and their applications according to the present disclosure may be prepared and used according to the examples set out below. These examples are presented herein for purposes of illustration of the present disclosure and are not intended to be limiting, for example, the preparations of the polymers and their applications.

EXAMPLES

Example 1

Polymerization was performed under flowing nitrogen atmosphere in 2 L jacketed reactor connected with water batch thermostat. A reactor was equipped with a reflux condenser, a thermocouple, two pitched turbine agitators and three inlet lines connected with pumps. 145 g of DI water, 1.0 g of sodium pyrophosphate, 1.0 g of Rhodapex® AB20U (29% solids, commercially available from Solvay S.A.), 4.0 g of ABEX® 2515 (50% solids, commercially available from Solvay S.A.) and 2.0 g of Tergitol® 15-S-20 (80% solution, commercially available from The Dow Chemical Company) were charged into the reactor and mixed for about 10-15 minutes until all the contents in the reactor were dissolved. 3.0 g of sodium persulfate were dissolved in 93.5 g of DI water to obtain an initiator solution. 2.0 g of sodium citrate were dissolved in 23.6 g of DI water to obtain a buffer solution.

194.5 g of DI water, 14 g of Reasop® SR-1025 (commercially available from Adeka Corporation), 0.15 g of 1-dodecyl mercaptan, 32 g of Rhodapex AB 20U, 6 g of ABEX 2515 (50% solids, commercially available from Solvay S.A.), and 1.8 g Aerosol® OT-75 (commercially available from Solvay S.A.) were charged into a 2 L mixer and mixed for about 10 minutes. 37 g of styrene, 3.0 g of 1,3-butanediol dimethacrylate (BDDM), 70 g of methyl methacrylate, 121 g of vinyl acetate, 24 g of 2-hydroxypropylacrylate, 960 g of 2-ethylhexyl acrylate (EHA) and 5.6 g of acrylic acid were added into the mixer under agitation. All of the contents in the mixer were mixed for about 30 min @ 500 rpm to form a homogeneous solution.

The reactor was heated up. When the reactor temperature reached to about 75-77° C., the homogeneous solution, the initiator solution and the buffer solution were charged into the reactor at the rates of about 6.1 g/min, 0.4 g/min and 0.1 g/min, respectively. The reactor temperature was maintained at about 84-86° C. for about 240 minutes.

Example 2

The polymerization was performed in the same reactor of Example 1. 160 g of DI water, 1.0 g of sodium pyrophosphate, 1.0 g of Rhodapex AB20U (29%) and 2.0 g of Tergitol 15-S-20 (80% solution) were charged into the reactor and mixed. 50 g of 2-EHA, 5 g methyl methacrylate, 0.3 g of acrylic acid and 1.15 g of styrene were added into the reactor and mixed for about 10 minutes. 9 g of sodium persulfate were dissolved in in 88 g of DI water to form an initiator solution. 2 g of sodium citrate were dissolved in 23.6 g DI water to form a buffer solution.

230 g of DI water, 30 g of Reasop SR-1025, 0.15 g of 1-dodecyl mercaptan, 30 g of Rhodapex AB 20U, 2 g Tergitol 15-S-20 were charged into a 2 L mixer and mixed for about 10-15 min. 20 g of styrene, 20 g of methyl methacrylate, 30 g of vinyl acetate, 22 g of 2-hydroxypropylacrylate, 1000 g of 2-ethylhexylethylhexyl acrylate, and 5.6 g of acrylic acid were charged into the mixer under agitation. All of the contents in the mixer were mixed for about 30 minutes @ 500 rpm to form a homogeneous solution.

The reactor was heated up to about 78-79° C. 8% of the initiator solution (7.8 g) were charged into the reactor. An exothermic polymerization reaction was taken place after a short induction period. After about 8-10 min when the temperature reached a steady state of about 80-81° C., the homogeneous solution, the initiator solution and the buffer solution were charged into the reactor at the rates of about 5.9 g/min, 0.4 g/min and 0.1 g/min, respectively. The temperature of the reactor was maintained at about 84-86° C. for about 240 minutes.

1.4 g of Bruggolite® FF6M (commercially available from Brüggemann Chemical) in 26.2 g of DI water and 1.4 g of tert-butyl hydroperoxide in 26.2 g of DI water were added as chaser solutions to reduce the residual monomers. The chase solutions were simultaneously added into the reactor for about 60 minutes while the temperature was decreased. 0.5 g of Kathon™ LX (commercially available from The Dow Chemical Company) was added when the temperature was reduced to about 30° C. or below. The product had about 66.3% total solids Example 2A The polymerization was performed in the same reactor of Example 1. 160 g of DI water, 1 g of sodium pyrophosphate, 1 g of Rhodapex AB20U (29%) and 1 g of ABEX-2535 were charged into the reactor and mixed. 50 g of 2-EHA, 5.0 g methyl methacrylate, 0.3 g of acrylic acid and 1.15 g of styrene were added into the reactor and mixed for about 10 minutes. 9.0 g of sodium persulfate were dissolved in in 88 g of DI Water to form an initiator solution. 2 g of sodium citrate were dissolved in 23.6 g DI water to form a buffer solution.

230 g of DI water, 0.15 g of 1-dodecyl mercaptan, 30 g of Rhodapex AB 20U, 7 g ABEX-2535 were charged into a 2 L mixer and mixed for about 10-15 min. 20 g of styrene, 20 g of methyl methacrylate, 30 g of vinyl acetate, 22.0 g of 2-hydroxypropylacrylate, 1000 g of 2-ethylhexyl acrylate, and 5.6 g of acrylic acid were charged into the mixer under agitation. All of the contents in the mixer were mixed for about 30 minutes @ 500 rpm to form a homogeneous solution.

The reactor was heated up to about 78-79° C. 8% of the initiator solution (7.8 g) were charged into the reactor. An exothermic polymerization reaction was taken place after a short induction period. After about 8-10 min when the temperature reached a steady state of about 80-81° C., the homogeneous solution, the initiator solution and the buffer solution were charged into the reactor at the rates of about 5.9 g/min, 0.4 g/min and 0.1 g/min, respectively. The temperature of the reactor was maintained at about 84-86° C. for about 240 minutes.

1.4 g of Bruggolite® FF6M (commercially available from Brüggemann Chemical) in 26.2 g of DI water and 1.4 g of tert-butyl hydroperoxide in 26.2 g of DI water were added as chaser solutions to reduce the residual monomers. The chase solutions were simultaneously added into the reactor for about 60 minutes while the temperature was decreased. 0.5 g of Kathon™ LX (commercially available from The Dow Chemical Company) was added when the temperature was reduced to about 30° C. or below. The product had about 66.3% total solids.

Example 2B

The polymerization was performed in the same reactor of Example 1. 160 g of DI water, 1 g of sodium pyrophosphate, 1 g of Rhodapex AB20U and 2 g of Tergitol 15-S-20 (80%) were charged into the reactor and mixed. 37.5 g of 2-EHA, 12.5 g of n-butyl acrylate (BA), 5.0 g methyl methacrylate, 0.3 g of acrylic acid and 1.15 g of styrene were added into the reactor and mixed for about 10 minutes. 8.8 g of sodium persulfate were dissolved in in 88 g of DI water to form an initiator solution, 2 g of sodium citrate) were dissolved in 23.6 g DI water to form a buffer solution.

230 g of DI water, 0.15 g of 1-dodecyl mercaptan, 30 g of Rhodapex AB 20U, 2 g Tergitol 15-S-20 were charged into a 2 L mixer and mixed for about 10-15 min. 20 g of styrene, 20 g of methyl methacrylate, 30 g of vinyl acetate, 22.0 g of 2-hydroxypropylacrylate, 750 g of 2-ethylhexyl acrylate, 250 g of BA and 5.6 g of acrylic acid were charged into the mixer under agitation. All of the contents in the mixer were mixed for about 30 minutes @ 500 rpm to form a homogeneous solution.

The reactor was heated up to about 78-79° C. 8% of the initiator solution (7.8 g) were charged into the reactor. An exothermic polymerization reaction was taken place after a short induction period. After about 8-10 min when the temperature reached a steady state of about 80-81° C., the homogeneous solution, the initiator solution and the buffer solution were charged into the reactor at the rates of about 5.9 g/min, 0.4 g/min and 0.1 g/min, respectively. The temperature of the reactor was maintained at about 84-86° C. for about 240 minutes.

1.4 g of Bruggolite® FF6M (commercially available from Brüggemann Chemical) in 26.2 g of DI water and 1.4 g of tert-butyl hydroperoxide in 26.2 g of DI water were added as chaser solutions to reduce the residual monomers. The chase solutions were simultaneously added into the reactor for about 60 minutes while the temperature was decreased. 0.5 g of Kathon™ LX (commercially available from The Dow Chemical Company) was added when the temperature was reduced to about 30° C. or below. The product had about 66.3% total solids.

Example 2C

The polymerization was performed in the same reactor of Example 1. 160 g of DI water, 1 g of sodium pyrophosphate, 1 g of Rhodapex AB20U (29%) and 2 g of Tergitol 15-S-20 (80% solution) were charged into the reactor and mixed. 50 g of 2-EHA, 5.0 g methyl methacrylate, 0.3 g of acrylic acid and 1.15 g of styrene were added into the reactor and mixed for about 10 minutes. 9.0 g of sodium persulfate were dissolved in in 88 g of DI water to form an initiator solution, 2 g of sodium citrate) were dissolved in 23.6 g DI water to form a buffer solution.

230 g of DI water, 30 g of Rheasop-1025, 0.15 g of 1-dodecyl mercaptan, 30 g of Rhodapex AB 20U, 2 g Tergitol 15-S-20 were charged into a 2 L mixer and mixed for about 10-15 min. 20 g of styrene, 31 g of methyl methacrylate, 30 g of vinyl acetate, 18 g of 2-hydroxylpropyl acrylate, 993 g of 2-EHA and 5.6 g of acrylic acid are charged into the mixer under agitation. All of the contents in the mixer were mixed for about 30 minutes @ 500 rpm to form a homogeneous solution.

The reactor was heated up to about 78-79° C. 8% of the initiator solution (7.8 g) were charged into the reactor. An exothermic polymerization reaction was taken place after a short induction period. After about 8-10 min when the temperature reached a steady state of about 80-81° C., the homogeneous solution, the initiator solution and the buffer solution were charged into the reactor at the rates of about 5.9 g/min, 0.4 g/min and 0.1 g/min, respectively. The temperature of the reactor was maintained at about 84-86° C. for about 240 minutes.

1.4 g of Bruggolite® FF6M (commercially available from Brüggemann Chemical) in 26.2 g of DI water and 1.4 g of tert-butyl hydroperoxide in 26.2 g of DI water were added as chaser solutions to reduce the residual monomers. The chase solutions were simultaneously added into the reactor for about 60 minutes while the temperature was decreased. 0.5 g of Kathon™ LX (commercially available from The Dow Chemical Company) was added when the temperature was reduced to about 30° C. or below. The product had about 66.3% total solids.

Example 3

The polymerization was performed in the same reactor of Example 1. 120 g of DI water, 0.5 g of sodium pyrophosphate, 1 g of sodium citrate, 1 g of Rhodapex® AB20U (29% solids), 3 g of ABEX® 2515 (50% solids), 16 g of methyl methacrylate, 73 g of 2-ethylhexyl acrylate and 0.3 g of acrylic acid were charged into the reactor and mixed for about 45 minutes. 3.5 g of ammonium persulfate were dissolved in in 95 g of DI water to form an initiator solution.

220 g of DI water, 14 g of Reasop SR-1025, 0.15 g of 1-dodecyl mercaptan, 22 g of Rhodapex AB 20U, 15 g of ABEX 2515 (50% solids) and 2 g of Aerosol® OT-75 (75% solids, commercially available from Solvay S.A.) were charged into a 2 L mixer and mixed for 10 min. 32 g of styrene, 200 g of methyl methacrylate, 62 g of vinyl acetate, 26 g of 2-hydroxypropylacrylate, 930 g of 2-ethylhexylethylhexyl acrylate, and 6.5 g of acrylic acid were charged into the mixer under agitation. All of the contents in the mixer were mixed for about 45 minutes @ 500 rpm to form a homogeneous pre-emulsion solution.

The reactor was heated up to about 78-80° C. 11 g of the initiator solution were charged into the reactor and reacted for about 20 minutes. Once the temperature reached to about 84-86° C., the homogeneous pre-emulsion solution was added at the rate of about 8 g/min along with the initiator solution at the rate of about 0.3 g/min. The reactor temperature was maintained at about 84-86° C. for about 180 minutes. Then the temperature was increased to about 87-89° C., and the rates of adding the pre-emulsion solution and the initiator were changed to about 5.1 g/min and about 0.36 g/min, respectively. 3.6 g of Bruggolite® FF6M (commercially available from Brüggemann Chemical) in 10 g of DI water and 1.2 g of ammonium persulfate, 6 g of tert-butyl hydroperoxide in 14 g of DI water were added as chaser solutions to reduce the residual monomers. The chase solutions were simultaneously added into the reactor for about 60 minutes while the temperature was decreased. 0.5 g of Kathon™ LX (commercially available from The Dow Chemical Company) was added when the temperature was reduced to about 30° C. or below.

The resultant polymer emulsion had 71.6% of solids by weight, the viscosity was 1150 cps (measured in a Brookfield RV viscometer with spindle #3 at 20 rpm) and the pH was about 4.3 after being filtered through a 100-mesh nylon filter.

Example 4

The polymerization was performed in the same reactor of Example 1. 120 g of DI water, 0.5 g of sodium pyrophosphate, 1 g of sodium citrate, 5 g of Rhodapex® AB20U (29% solids), 5 g of ABEX® 2515 (50% solids), 111 g of methyl methacrylate, 116 g of 2-ethylhexyl acrylate and 0.6 g of acrylic acid were charged into the reactor and mixed for about 45 minutes. 5.5 g of ammonium persulfate were dissolved in 93 g of DI water to form an initiator solution.

220 g of DI water, 7 g of Reasop SR-1025, 0.4 g of 1-dodecyl mercaptan, 29 g of Rhodapex AB 20U, 18 g of ABEX 2515 (50% solids) and 1.8 g of Aerosol OT-75 were charged into a 2 L mixer and mixed for 10 min. 77 g of styrene, 433 g of methyl methacrylate, 39 g of vinyl acetate, 26 g of 2-hydroxypropylacrylate, 532 g of 2-ethylhexyl acrylate, and 4.5 g of acrylic acid were charged into the mixer under agitation. All of the contents in the mixer were mixed for about 45 minutes @ 500 rpm to form a homogeneous pre-emulsion solution.

The reactor was heated up to about 73-75° C. the initiator solution was charged into the reactor for about 45 minutes at the rate of about 0.24 g/min. The temperature was reached to about 84-86° C. After about 30 min, the pre-emulsion solution was added at the rate of about 8 g/min along with the initiator solution at the rate of about 0.3 g/min. The reactor temperature was maintained at about 84-86° C. for about 120 minutes. Then the temperature was increased to about 87-89° C., and the rates of adding the pre-emulsion solution and the initiator were changed to about 5.1 g/min and about 0.36 g/min, respectively. 3.5 g of Bruggolite FF6M in 10 g of DI water and 1.2 g of ammonium persulfate, 6 g of tert-butyl hydroperoxide in 14 g of DI water were added as chaser solutions to reduce the residual monomers. The chase solutions were simultaneously added into the reactor for about 60 minutes while the temperature was decreased. 0.5 g of Kathon LX was added when the temperature was reduced to about 30° C. or below.

The resultant polymer emulsion had 70.8% of solids by weight, the viscosity was 1870 cps and the pH was about 3.9 after being filtered through a 100-mesh nylon filter. The film properties (4 mils) are listed in Table 1.

TABLE 1

| Pencil hardness (ASTM D 3363 00) | Scratch hardness (ASTM D 3363 00) | Gloss (DIN 67530) | Water resistance (ASTM D870) |
|---|---|---|---|
| HB | 4B | 67 | Pass |

The hardness testing shown in Table 1 was carried out with the hardest pencil (6H) as first and continued down the scale of hardness to either of two end points; one, the pencil that would not cut into or gauge the film (pencil hardness, or two, the pencil that would not scratch the film (scratch hardness)

PSA Property Test
Peel Test Method

Peel is a standard test to measure peel adhesion strength in pressure sensitive tapes. The peel strength is the force with which adhesive applied to a backing material opposes removal from the substrate at a defined removal speed. The pressure sensitive tape council-101 (PSTC-101) is a Harmonized International Standard. These standard testing procedures evaluate the peel force of the adhesive under constant temperature and humidity (23±1° C., 50±5% RH), and under a fixed peel rate and angle. Peel resistance is the ability of a material to resist forces that can pull it apart by separating one surface from the other, measured in lb/in.

PSTC-101 required a sample (tape) sizes to be 24 mm wide by 300 mm long. The tape sample was applied to the clean surface (stainless steel plate size 3"×6") using 10 lbs weighted sample roller to ensure consistent and repeatable pressure. Dwell time was 30 min. The testing plate was clamped with the lower end of a peel tester. The free end of the specimen was clamped in the upper vice grip of the peel tester. Separate grips were applied at a constant rate of speed (12"/min) throughout the length of the specimen. The tape was peel of the testing plate. The average force and displacement were recorded. 90-degree peel and 180-degree peel tests were employed. The tests were run at different temperatures. The peel adhesion was tested on Instron Universal Testing system 4411/4464.

Shear Test Method

Shear adhesion was tested on a standard steel panel. A strip of tape was applied to a standard steel panel under controlled roll down. The contact area was 1"×1". The panel was mounted vertically. A 1 kg mass was attached to the free end of the tape after 30 min applying the tape to the plate. The time to failure was determined.

Loop Tack Test Method

Loop tack test provides a quantitative measure of the pressure-sensitive tack of the adhesive. This test method is applicable to those adhesives which form a bond of measurable strength rapidly upon contact with another surface and which can be removed from that surface cleanly, that is, without leaving a residue visible to the eye. For such adhesives, tack may be measured as the force required to separate an adhesive and the adherent at the interface shortly after they have been brought into contact under a defined load of known duration at a specified temperature. During the test, the probe traveled down at a constant speed to contact the probe the PSA film and when contacted maintained a quick contact force for 2 seconds. The probe than pulled away at the same constant speed. The entire negative load profiled as the probe pools away was reordered even though the tack test needed only the peak force. Cheminstruments, (commercially available from Fairfield, Ohio) was used for the loop tack testing.

Example 5

Formulations of the emulsions were made using the polymer emulsions prepared from Examples 2, 2B and 2C. Table 2 lists the ingredients of the formulations.

TABLE 2

| Ingredients | Amounts |
|---|---|
| Polymer emulsion prepared in Example | 400 g |
| DI water | Added to bring the solids to about 56-58% |
| 28% Ammonium | 2.0 g added to adjust the pH = 7.5-8.5 |
| Aerosol OT-75 | 2.8 g |
| Dee Fo ® 218(commercially available from Münzing Chemie GmbH) | 0.8 g |
| Rheolate ® 425 (commercially available from Elementis Specialties) | 1 g added to adjust the viscosity to about 1000 cPs* |

*BV measured by RVT Brookfield Viscosmeter using the spindle #3/20 rpm

The formulations were tested for their physical characteristics. DI water was added to adjust the total solids for each sample. The results are shown in Table 3. The formulations were directly coated onto 2 mils Mylar and tested on stainless steel plate for adhesive performance. The adhesive film thickness was about 1 mil. Table 4 lists the adhesive performance testing results.

TABLE 3

| Example No. | Total Solids (TS) % | pH | BV cps #3/20 | Coagulum 100 mesh filter ppm | DSF* mN/m |
|---|---|---|---|---|---|
| 2 | 56.5 | 7.4 | 1000 | 250 | 32.8 |
| 2B | 56 | 7.5 | 1050 | 780 | 34.2 |
| 2C | 56.8 | 7.7 | 1120 | 800 | 35.2 |

*DSF (Dynamic surface tension) measured with Bubble Pressure Tensiometer BP50, commercially available from Krüss.

TABLE 4

| | Peel 30 min dwell 180-degree peel | | Peel 24 hr dwell 180-degree peel | | Loop tack | | Shear 1" × 1" 1 kg | |
|---|---|---|---|---|---|---|---|---|
| Example No. | lb/in | Failure Mode | lb/in | Failure Mode | lb/in | Failure Mode | Hour | Failure Mode |
| 2 | 2.9 | C* | 3.1 | C* | 4.0 | C* | 16 | C* |
| 2B | 3.2 | C* | 3.3 | C* | 4.5 | C* | 6 | C* |
| 2C | 3.0 | T** | 3.0 | T** | 4.2 | C*/T** | 12 | C* |

*C—cohesive failure,
**T—transfer failure.

The formulation prepared from the polymer emulsion of Example 2 as described above, was coated at a pilot coater with the speed 700 ft/min with a film thickness of 0.8 mills using the transfer method via release liner to 2 mills paper substrate. Then adhesion tests were performed at the room temperature of about 23° C. and −20° C. on stainless steel (SS), Glass, high density polyethylene (HDPE) and corrugated cardboard (CC) substrates. Table 5 lists the test results.

TABLE 5

| Substrate | Stainless Steel | | | Glass | | | HDPE | | | Corrugated Cardboard | | |
|---|---|---|---|---|---|---|---|---|---|---|---|---|
| | lb/in | N/in | Failure Mode | lb/in | N/in | Failure Mode | lb/in | N/in | Failure Mode | lb/in | N/in | Failure Mode |
| Temperature testing: 23° C. | | | | | | | | | | | | |
| 90° Peel, 30 min | 2.6 | 11.5 | C | 2.0 | 8.9 | A* | 0.7 | 3.1 | A* | 1.4 | 6.2 | C |
| 90° Peel, 24 hr | 3.1 | 13.8 | C | 2.2 | 9.8 | A* | 0.9 | 4.0 | A* | 1.3 | 5.8 | C |
| Shear, 30 min/1" × 1" × 1000 g, 30 min dwell, minutes | 1080 min | — | C | — | — | — | — | — | — | 48 min | — | C |
| Loop tack, 1" × 1" | 4.20 | 18.7 | A* | 3.5 | 15.6 | A* | 1.90 | 8.5 | A* | 1.1 | 4.9 | A* |
| Coat thickness (mil) | | | | | 0.8 | | | | | | | |
| Temperature Testing: −20° C. | | | | | | | | | | | | |
| 90° Peel, 30 min dwell | 0.40 | 1.80 | Paper tear | 0.5 | 2.20 | Paper tear | 0.40 | 1.80 | A*/Z** | 0.90 | 4.0 | A* |
| Coat thickness (mils) | | | | | 0.8 | | | | | | | |

*A—adhesive failure,
**Z—zippering failure.

Example 6

The polymer emulsion prepared from Example 3 were hand drawn-down 1 mil thickness onto 2 mil Mylar polyester film and tested on stainless steel substrate using the pressure sensitive tape council (PSTC) methods described previously. The testing results are listed in Table 6.

TABLE 6

| | | |
|---|---|---|
| Peel 180°, 30 min dwell | 3.86 lb/in | C |
| Peel 180°, 24 hr dwell | 4.3 lb/in | C |
| Shear ½" × ½" × 500 g, 30 min. dwell | 46 hours | C |
| Loop tack | 3.6 lb/in | A |

Example 7

The polymer emulsion obtained from Example 3 was formulated into a tackified PSA as shown in Table 7.

TABLE 7

| Ingredients | Amounts |
|---|---|
| Polymer emulsion of Example 3 | 221 g |
| Tufcor ® C815 (commercially available from Celanese) | 30 g |
| DI water | Added to bring the solids to about 53 to 55% by weight |
| 28% Ammonium | Added to make the pH to about 7.8-8.2 |
| Snowtack ™ 780 G (commercially available from Lawter) | 118.1 g |
| Surfynol ® 440 (commercially available from Air Products) | 3 g |
| Dee Fo ® 215(commercially available from Münzing Chemie GmbH) | 0.6 g |
| Rheolate ® 425(commercially available from Elementis Specialties) | Added to adjust the viscosity to about 750 cPs |
| Promex ™ 20D (commercially available from PromChemie AG) | 0.5 g |

PSA properties were tested on stainless steel (SS), high density polyethylene (HDPE) and corrugated cardboard (CC). The properties are listed in Table 8.

TABLE 8

| | SS | | HDPE | | CC | |
|---|---|---|---|---|---|---|
| Peel 90°, 30 min dwell, lb/in | 3.46 | C | 1.8 | A | 1.6 | A |
| Peel 90°, 24 hr, dwell, lb/in | 3.87 | C | 1.85 | A | 1.67 | A |
| Shear 1" × 1" × 1 kg, 30 min dwell, hrs | 36 | C | — | — | — | — |
| Loop tack, lb/in | 4.2 | A | 1.75 | A | 1.9 | A |

2 mil Mylar facestock; 1 mil adhesive film thickness directly coated.

What is claimed is:

1. An emulsion, comprising:
   a plurality of multiphase polymer particles, the multiphase polymer particles comprising an acrylic-based copolymer derived from monomers comprising:
   an alkyl methacrylate;
   an alkyl acrylate;
   a hydroxyalkyl acrylate or hydroxyalkyl methacrylate;
   at least one acid;
   a vinyl aromatic compound; and
   a vinyl ester or vinyl lactam,
   at least one copolymerizable surfactant,
   at least one alkylphenol ethoxylate (APE) free nonionic surfactant, and
   at least one APE free anionic surfactant in an aqueous medium in the presence of a free-radical initiator and a buffer.

2. The emulsion of claim 1, wherein the alkyl acrylate is selected from the group consisting of n-butyl acrylate, sec-butyl acrylate, tert-butyl acrylate, 2-ethylhexyl acrylate, iso-bornyl acrylate, iso-bornyl methyl acrylate, ethyl acrylate, iso-octyl acrylate and decyl acrylate, and hexyl acrylate.

3. The emulsion of claim 1, wherein the alkyl methacrylate is methyl methacrylate, ethyl methacrylate, 2-ethylhexyl methacrylate, n-butyl methacrylate, sec-butyl methacrylate, tert-butyl methacrylate or dodecyl methacrylate.

4. The emulsion of claim 1, wherein the hydroxyalkyl acrylate or hydroxyalkyl methacrylate is hydroxyethyl acrylate, hydroxyethyl methacrylate, hydroxypropyl acrylate, hydroxypropyl methacrylate, 4-hydroxybutyl acrylate or 4-hydroxybutyl methacrylate.

5. The emulsion of claim 1, wherein the vinyl ester is selected from the group consisting of vinyl acetate, vinyl butyrate, allyl acetate and vinyl iso-butyrate.

6. The emulsion of claim 1, wherein the at least one acid is selected from the group consisting of acrylic acid, methacrylic acid, itaconic acid, dimethacrylic acid, maleic acid, fumaric acid, and beta-carboxyethyl acrylate.

7. The emulsion of claim 1, wherein the vinyl aromatic compound is styrene, α-methylstyrene, o-chlorostyrene or vinyl toluene.

8. The emulsion of claim 1, wherein the vinyl lactam is vinyl pyrrolidone or vinyl caprolactam.

9. The emulsion of claim 1, wherein the at least one copolymerizable surfactant has a formula I:

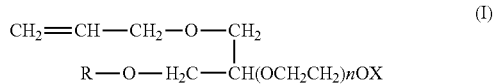

where: R is an alkyl;
X is H, SO$_3$NH$_4$ or SO$_3$Na; and
n is from about 3 to about 50.

10. The emulsion of claim 9, wherein R is a C9-C15 alkyl group.

11. The emulsion of claim 9, wherein n is from about 10 to about 40.

12. The emulsion of claim 9, wherein the copolymerizable surfactant is selected from the group consisting of ammonium salts of poly(oxy-1,2-ethanediyl), alpha-sulfo-omega-[1-(hydroxymethyl)-2-(2-propenyloxy)ethoxy], and C10-C14 branched alky ether.

13. The emulsion of claim 1, wherein the at least one copolymerizable surfactant is selected from the group consisting of sodium polyoxyethylene alkyl ether sulfuric ester, sodium alkyl allyl sulphosuccinate, polyoxyethylene styrenated propenyl phenyl ether sulfate ammonium salt and sodium vinyl sulfonate.

14. The emulsion of claim 1, wherein the least one APE free nonionic surfactant is selected from the group consisting of secondary alcohol ethoxylate, tridecyl alcohol ethoxylate and polyethoxylated oley alcohol.

15. The emulsion of claim 1, wherein the at least one APE free anionic surfactant is selected from the group consisting of sodium lauryl ether sulfate, sodium lauryl ethoxylate, sodium tridecyl ether sulfate, sodium alpha olefin sulphonate, sodium dodecylbenzene sulphonate, disodium alkyl diphenyl oxide sulphonate, sodium dioctyl sulfosuccinate, sodium lauryl ether sulfate and alkyldiphenyloxide disulphonate disodium salt.

16. The emulsion of claim 1, wherein the free-radical initiator is selected from the group consisting of sodium persulfate, ammonium persulfate, potassium persulfate, t-butyl hydroperoxide, sodium formaldehydesulfoxylate, zinc formaldehydesulphoxylate, and disodium salts of 2-Hydroxy-2-sufinatoacetic acid and 2-hydroxy-2-sufonatoacetic acid.

17. The emulsion of claim 1, wherein the buffer is selected from the group consisting of disodium pyrophosphate, sodium citrate, sodium bicarbonate and sodium carbonate.

18. The emulsion of claim 1, wherein the acrylic-based copolymer is derived further from a cross-linker.

19. The emulsion of claim 18, wherein the acrylic-based copolymer is derived further from a chain transfer agent selected from the group consisting of 1-dodecyl mercaptan, ascorbic acid, butylated hydroxyanysole, and n-butyl mercaptan.

20. The emulsion of claim 18, wherein the cross-linker is selected from the group consisting of 1,3-butanediol dimethacrylate, 1,4-butanediol dimethacrylate, diacetone acrylamide (with any one of adipic dihyrazide, oxalic acid dihydrazide, malonic acid dihydrazide, glutaric acid dihydrazide, succinic acid dihyrazide, adipic acid dihydrazide, sebacic acid dihydrazide), acrylamide, isobutyl methacrylamide, 1,6-hexane diol diacrylate, zinc oxide, metal acetyl acetonate, acetoacetoxyethylmethacrylate (AAEM), glycide methacrylate, hexamethylenediamine and urea.

21. The emulsion of claim 1 wherein the emulsion comprises 45 to 75% by weight of solids.

22. The emulsion of claim 1, wherein the emulsion has a $T_g$ of −55 to +70° C. or −60 to +60° C.

23. A coating formulation comprising: an emulsion comprising a plurality of multiphase polymer particles comprising an acrylic-based copolymer derived from monomers comprising:
- an alkyl methacrylate;
- an alkyl acrylate;
- hydroxyalkyl acrylate or hydroxyalkyl methacrylate;
- at least one or more acids;
- a vinyl aromatic compound; and
- a vinyl ester or vinyl lactam,
- at least one copolymerizable surfactant,
- at least one or more alkylphenol ethoxylate (APE) free nonionic surfactant, and
- at least one or more APE free anionic surfactant in the presence of an initiator and a buffer.

24. An adhesive composition comprising: an emulsion comprising a plurality of multiphase polymer particles comprising an acrylic-based copolymer derived from monomers comprising:
- an alkyl methacrylate;
- an alkyl acrylate;
- hydroxyalkyl acrylate or hydroxyalkyl methacrylate;
- at least one or more acids;
- a vinyl aromatic compound; and
- a vinyl ester or vinyl lactam,
- at least one copolymerizable surfactant,
- at least one or more alkylphenol ethoxylate (APE) free nonionic surfactant, and
- at least one or more APE free anionic surfactant in the presence of an initiator and a buffer.

\* \* \* \* \*